May 17, 1960 J. JENSEN 2,936,748
LUBRICATION FOR TWO-STROKE CYCLE ENGINES
Filed Sept. 2, 1955 3 Sheets-Sheet 1

INVENTOR:
JENS JENSEN,
BY Homer R. Montague
ATTORNEY

INVENTOR:
JENS JENSEN,

May 17, 1960  J. JENSEN  2,936,748
LUBRICATION FOR TWO-STROKE CYCLE ENGINES
Filed Sept. 2, 1955  3 Sheets-Sheet 3

INVENTOR:
JENS JENSEN
By: Homer R. Montague
ATT'Y.

United States Patent Office 2,936,748
Patented May 17, 1960

2,936,748

LUBRICATION FOR TWO-STROKE CYCLE ENGINES

Jens Jensen, St. Helier, Jersey, Channel Islands, assignor to John Speaks, Norwalk, Conn.

Application September 2, 1955, Serial No. 532,310

11 Claims. (Cl. 123—196)

This application is a continuation-in-part of application Serial No. 353,542, filed May 7, 1953, now abandoned.

This invention pertains to internal combustion engines, and particularly to improvements in the lubrication of engines in which the lubricant or oil is introduced by mixing it with the fuel, usually gasoline. Thus, while not limited in principle to such engines, these improvements may be considered as relating principally to engines of the two-stroke cycle type, in which the lubricating oil is normally mixed with the liquid fuel rather than being supplied as a separate material.

In the conventional single or multi-cylinder engine of the two-stroke cycle type, the lubricating oil, being less volatile than the fuel, passes in the form of suspended droplets entrained with the vaporized fuel itself, into the crankcase and cylinder of the engine. Such engines thus depend for their lubrication upon the more or less fortuitous encounter of these lubricant droplets with those moving engine parts which are to be lubricated. While it would seem that if enough oil is mixed with the fuel adequate lubrication may be ensured, the fact is that the presence of excessive oil in the cylinder or combustion chamber is deleterious to engine life because it results in the formation of excessive carbon or other deposits. The relatively higher cost of oil is also a factor.

The present invention provides for physical separation of the oil which is conveniently entrained in the stream of gaseous fuel charge or air-fuel mixture, whereby the lubricant may be selectively directed to the lubricating points at which its presence is most desired. In particular, the engine provides in effect a pressurized lubrication system for two-stroke cycle engines which ensures long operating life with low maintenance, while retaining the inherent advantage of an engine in which the lubricant is merely admixed with the liquid fuel rather than having to be handled in a separate pressure-lubricating system.

As a corollary to the above, the invention permits superior lubrication to be accomplished with a considerable reduction in the amount of lubricant which must be mixed with the fuel; that is, in the ratio of oil to fuel which is used. This yields a saving in operating cost, but even more significantly it results in the fact that considerably less oil is present in the final charge which is burned in the combustion chamber, thus minimizing carbon or other deposits and other results inimical to long and trouble-free engine life.

The present invention includes an arrangement of an engine of the above type in which lubricant under pressure is supplied directly to the bearings and piston rings of the engine, so that mechanical wear at these critical points is greatly minimized.

The invention also provides for the special application of the above improvements to twin or multi-cylinder engines of either the vertical or horizontal crank shaft configurations.

With the above discussion in mind, the invention itself, and a preferred manner of practicing the same, will best be understood by referring to the following detailed specification of certain preferred embodiments thereof, given by way of example. The specification is to be taken in connection with the appended drawings, in which.

Figure 1:
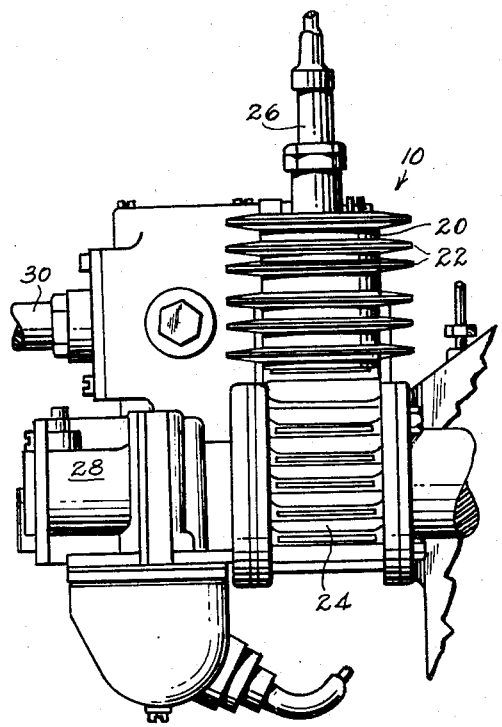
Fig. 1 is a side elevation of a typical single cylinder engine to which the invention has been applied.

Referring first to Fig. 1 of the drawing, numeral 10 designates generally a single cylinder two-stroke cycle engine having a cylinder 20 which will ordinarily be ribbed as at 22 to provide cooling fins. 24 designates a similarly ribbed crankcase. A spark plug 26 is provided for the single cylinder, being supplied with the necessary ignition potential as from a conventional magneto and breaker-point arrangement designated generally by numeral 28. Numeral 30 designates the combustion products exhaust line from the cylinder. As is common in smaller engines of this type, the explosive charge, including entrained lubricant, is admitted initially into the crankcase 24, from which is passes to the combustion chamber within cylinder 20 via transfer ports to be described below.

Figure 2:
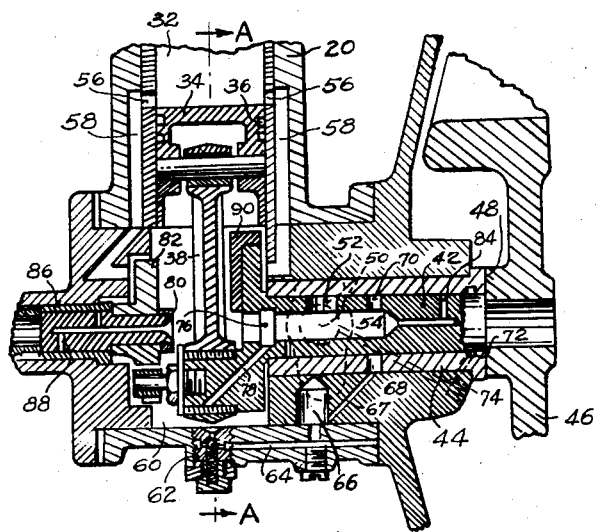
Fig. 2 is a central vertical sectional view, to a different scale and with parts broken away, of an engine similar to that shown in Fig. 1.

The internal arrangement of the engine will be better understood by referring now to Fig. 2, in which similar reference numerals are used for the parts already described. The cylinder 20 is shown as provided with a liner sleeve 32 within which operates the piston 34 having the usual piston rings 36. The piston 34 has pivoted thereon the connecting rod 38 which, at its other end, is journalled upon a crank pin 40 carried by the crankshaft 42 journalled as by sleeve 44 within the main engine casting. A flywheel 46 is indicated in Fig. 2 as rigidly connected to the crankshaft and having a thrust bearing at 48 which is the interface between the crankshaft hub and the end face of sleeve 44.

The combustion charge, containing the entrained lubricating oil, is formed in any convenient carburettor, of which the prior arts affords many examples, and is delivered to the charge inlet port 50 which, at the proper time during rotation of the crankshaft 42, communicates via a valve port 52 leading to the hollow bore 54 of the crankshaft.

The engine in Fig. 2 is shown at the end of its downward or crankcase compression stroke, so that the piston has uncovered transfer ports 56 in the sleeve 32 to allow the charge in the crankcase to enter the combustion space via the passages 58 leading from the crankcase space 60. This charge was admitted to the crankcase somewhat earlier; to wit, at the time when valve port 52 registered with the inlet port 50 from the charge-forming device. At a later stage, and as well known to those skilled in the art, rotation of the crankshaft will cause the piston 34 to rise, closing ports 56 and compressing the charge in the combustion chamber until ignition occurs near the top of this compression stroke, thus again to drive the piston downwardly to scavenge the combustion space into exhaust 30 and ultimately to permit the ingress of the next fuel charge. It will be noted that during the downward stroke of the piston, and until such time as ports 56 are uncovered, the crankcase space 60 will be under compression.

In Fig. 2 of the drawings 62 is a spring loaded non-return valve, which may be of the ball type as shown or of any other suitable type, located at the lowest point of the crankcase. The delivery side of valve 62 is connected by a drilled or cored passage 64 to the base of a reservoir chamber 66, which otherwise has no connection with the crankcase.

From the base of chamber 66 a passage 67 communicates with port 68 in main bearing sleeve 44. 70 is a port in hollow crankshaft 42 which registers with port 68 when the piston has moved to the top, or nearly the top, of its stroke.

72 is an annular groove bored at a short distance from the outer end of main bearing sleeve 44. 74 is an angularly drilled passage connecting the lowest point of annular groove 72 with the gas inlet port 50. 76 is an annular groove bored in crankshaft 42. 78 is a hole drilled from the surface of crankpin 40 to annular groove 76. Numeral 80 designates the end of the hollow shaft of a driven component, such as the magneto 28. 82 is a disc, attached to shaft 80, by means of which this shaft is driven.

The operation of the invention will now be described.

As the piston descends during the crankcase compression stroke, the pressure in the crankcase causes the ball valve 62 to open and a small quantity of gaseous mixture, together with any oil there may be at the bottom of the crankcase, is forced along passage 64 into chamber 66. As the piston nears the end of its downward stroke it uncovers the transfer or scavenging ports 56 and the crankcase pressure is released but the charge in chamber 66 still remains at crankcase compression pressure and any oil that has entered the chamber will be at the lowest point in the chamber. Approximately one half revolution later, when the pressure in the crankcase has become negative or below atmospheric pressure, due to the upward travel of the piston, port 70 in the crankshaft will register with port 68 thus putting chamber 66 into direct communication, via passage 54 and the crankshaft, with the crankcase. The residual gaseous pressure in chamber 66 will then expel oil from the base of chamber 66 into the crankshaft where it will meet the incoming charge entering the crankshaft through port 52 which, in the meantime, will have rotated till it registers with inlet port 50 from the carburettor.

As the gaseous fuel and oil of the incoming charge, now augmented by the oil entering the crankshaft through ports 68 and 70 as already explained, are swept along the hollow crankshaft toward the crankcase, centrifugal force will cause the oil, as the heavier component, to tend to adhere to the wall of the hollow shaft. A certain amount of this oil will be collected by annular groove 76 and will, by increased centrifugal force, be impelled up passage 78 onto the rubbing surfaces of crankpin 40 and its bearing in the connecting rod.

A certain amount of oil, not collected in annular groove 76, will be blown across the crankcase into the end of the hollow shaft 80 of any driven component which may be, as stated, the magneto.

Though the oil in the crankshaft will move towards the crankcase, a certain amount will remain in ports 52 and 70 and this oil, during the crankcase compression stroke, when ports 52 and 70 are not in register with ports 50 and 68, will be forced between the rubbing faces of the crankshaft and bearing. In order to ensure the distribution of oil evenly over these rubbing surfaces additional small radial holes such as at 84 may be drilled in the crankshaft. In order to lubricate bearing 86 of shaft 80, similar small radial holes 88 are drilled in shaft 80.

As the oil is forced into the main bearing at crankcase compression pressure, the pressure is fairly considerable and there will be oil leakage at both ends of the bearing. The oil leaking into the crankcase will be centrifuged by the crankshaft onto the cylinder walls and around the interior of the crankcase. Most of it will eventually pass through non-return valve 62 and again go into circulation.

The oil that would leak or flow outwards is collected in annulus 72 in the main bearing and is drawn along passage 74 into the inlet port 50, mixing with the incoming charge and thus is again put into circulation.

In order to minimize as far as possible the passage of the oil up the transfer passages 58, and through ports 56 the entries to these passages are located at points well away from the whirling plane of the connecting rod and at points near to the longitudinal center line of the crankcase. Also, in the positions shown in Fig. 2, the entries are shielded from the ingress of oil spray by the crankshaft balance weight 90 and the disc 82, which, at the transfer period of the cycle, are opposite the entries to the transfer passages 58.

It is a characteristic and obvious feature of all known engines which depend for their lubrication on oil mixed with the fuel, that all the oil entering with the fuel, whatever the fuel-oil mixture may be, must eventually and inevitable pass into the combustion space. Therefore, the consumption of oil, in relation to the consumption of fuel, will always be in the exact ratio of oil to fuel in the mixture.

It is apparent that, with the proposed construction consisting of check valve 62, the chamber 66 and the passages described, much of the oil which separates from the fuel-oil mixture will be circulated several times around the circuit formed by said passages, before it eventually finds its way to the combination chamber. Thus, an ample amount of oil will always be present for lubrication, even though the proportion of oil in the fuel-oil mixture may be small, and the oil consumption correspondingly reduced. The method of oil recirculation in a two-stroke cycle engine as disclosed above and best shown in Fig. 2 makes possible a reduction in the oil content of oil-fuel mixtures, from the usual average of about 1 to 24, down to from 1 to 300 to 1 to 400, or even lower, with a proportionate saving in oil consumption. A further improvement provides desirable additional lubrication of the piston and cylinder, and forms a special feature of this invention.

Figure 3:
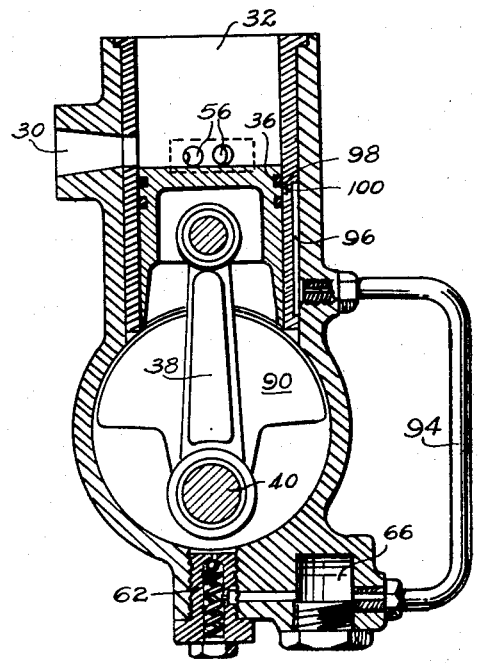
Fig. 3 is a vertical sectional view taken substantially on the line A—A of Fig. 2.

The piston lubricating feature which forms part of the present invention will best be understood from Fig. 3 of the drawings, which is a section taken on line A—A of Fig. 2. In the interests of clarity of the drawings, the section plane is such that in Fig. 3 the axis of the non-return valve 62 is coplanar with the vertical axis of the reservoir or chamber 66. Actually, as is apparent from Fig. 2 the chamber 66 will ordinarily lie behind the plane of the valve 62.

Referring now to Fig. 3, and as previously described, fuel-air mixture, together with oil from the bottom of the crankcase, is forced through non-return valve 62 to pressure chamber 66 during the crankcase compression stroke. Most of this oil will pass into the lubricating system via the timed ports 68 and 70 (Fig. 2) when the crankcase space is in the suction phase, as already described. However, some of this oil in chamber 66 will pass upwards in pipe 94 which communicates with a vertical groove 96 milled in the cylinder liner 32, and which groove extends upwardly to the level shown, where it communicates with an annular groove 98 turned in the inner liner wall. A hole 100 is drilled through the liner to connect the grooves 96 and 98. Circular groove 98 is located at such a height in the liner that it coincides with the bottom of the upper piston ring 36 when the piston is at bottom dead center, at which point there is very little pressure in the crankcase as the transfer ports 56 (Fig. 2) are fully open. It is clear that some oil can then pass from the pressure chamber 66 (which is still under pressure due to non-return valve 62) to the circular groove 98 and to the circumference of the upper ring.

An instant later, as the piston rises, the lower ring will pass upwards past the oil-laden groove 98. In this way, it becomes immaterial whether the fuel-air charge entering the combustion space via transfer ports 56 contains any substantial amount of oil, because the piston and cylinder are adequately lubricated by the direct pressure system just described. Hence, the proportion of oil in the fuel and oil mixture can be further reduced without sacrifice of engine life, and thereby the frequency of occurrence of objectionable carbon or other deposits can also be reduced.

The above description of Fig. 3 depends upon the use of a separate cylinder liner 32 in which the vertical groove 96 is provided by milling the liner before it is inserted. Where a liner is not employed, it is obvious that pipe 94 could be carried upward to the level of annular groove 98 and connected to said groove by a hole such as hole 100.

Figure 4:
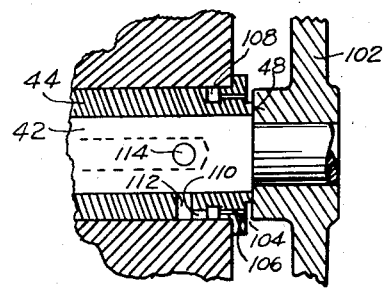
Fig. 4 is a fragmentary sectional view showing alternative details of the shaft end and main bearing of the engine shown in Fig. 2.

The invention also comprises an alternative method of lubrication of the face of the flywheel where it contacts the main bearing and alternative means of preventing oil leakage from the end of bearing 44. These parts are shown to a somewhat enlarged scale in Fig. 4, in which numeral 102 designates the flywheel whose hub engages the end face of the main bearing sleeve at 48. The thrust face of the bearing sleeve is slightly relieved, as at 104, a small amount, such as 2 and 3 thousandths of an inch. From the relieved face small holes 106 are drilled axially into groove 108 formed in the outer surface of sleeve 44. This groove 108 communicates, as at 110, with a port or hole 112 drilled through the sleeve 44. Another port or hole 114 is drilled in the wall of the hollow crankshaft 42, and so positioned with relation to the engine crankpin that it registers with port 112 during the crankcase suction period. Consequently any oil that leaks outwardly from the thrust faces between bearing and flywheel will pass over the outer exposed ends of holes 106 and will be drawn inwards by the crankcase suction. In this way, leakage of oil at this point is reduced or eliminated.

Figure 5:
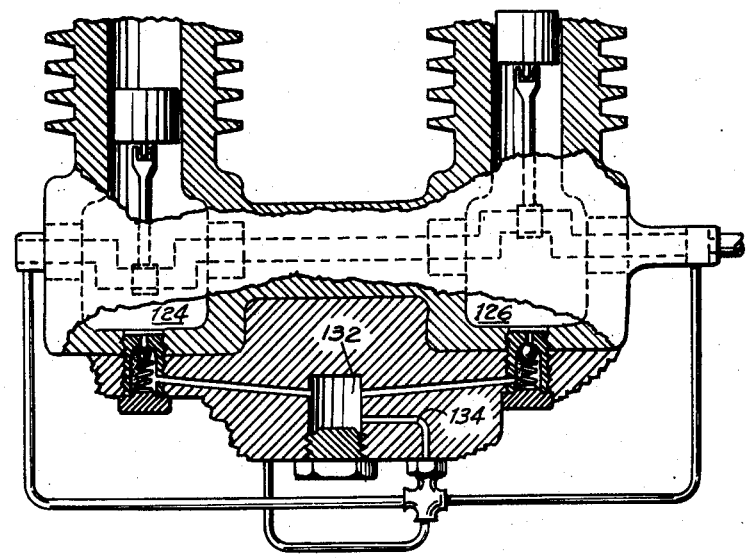
Fig. 5 is a diagrammatic view of a twin cylinder engine having a horizontal crank shaft, and embodying one of the principles of the present invention.
Figure 6:
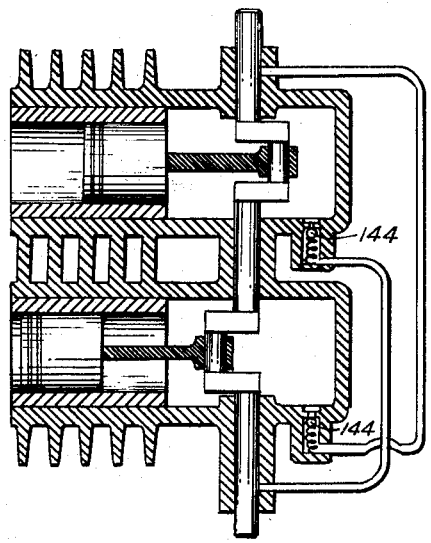
Fig. 6 is a similar view of a twin cylinder engine having a vertical crank shaft.

Figs. 5 and 6 of the drawing show the preferred way in which the pressured lubricating features are applicable to multi-cylinder engines. In Fig. 5, for example, is shown a twin-cylinder engine of the two-stroke cycle type, having cylinders 120 and 122, a horizontal crankshaft and individual crankcase spaces 124 and 126, each being provided at its lowest point with a non-return valve such as at 128 and 130. The latter operate precisely as described for valve 62 in Fig. 2. However, instead of providing also individual reservoir or pressure chambers, it is preferred to provide a single common chamber 132 communicating by independent ducts with the two non-return valves. From a low point of this chamber, a single outlet line or duct 134 is led to a distribution fitting such as 136, from which lead independent oil supply lines 138, 140 and 142, to the respective main bearings, including a center bearing if such is provided.

The arrangement just described has the advantage that any uneven distribution of oil is equalized as amongst the several lines, because the pressure head on all lines is equalized by the common storage or reservoir chamber 132.

In twin cylinder engines having vertical crankshafts, as illustrated schematically in Fig. 6, each crankcase space will again be provided with an individual non-return valve such as at 144, but in place of a common reservoir, the oil line from the lower valve will lead to the cylinder and/or main bearings of the upper cylinder, and vice versa. In this way, the difficulty arising from the drainage of oil from the upper cylinder to the lower will be continually rectified.

The extension of the above arrangements to 4-cylinder engines, or even larger, will be obvious to those skilled in the art, each pair of cylinders being considered as a single source with respect to the oil supply lines.

It will be appreciated that Figs. 5 and 6 are intended to show only the distribution of oil from one to another cylinder line in twin or multi-cylinder engines. The subsequent channeling or conduction of the oil, after it has arrived at the appropriate main bearing is precisely the same as described in detail for Figs. 2 and 3.

In small two-stroke cycle engines, such as those under consideration, several methods of introducing the gaseous charge into the crankcase are in general use. In the type shown for illustrative purposes, and shown in Fig. 2, the charge enters, via controlled or timed ports, through the hollow crankshaft.

Other methods of introducing the charge into the crankcase are by piston-controlled inlet and by disc valve-controlled inlet and by so called reed-valves.

It will be obvious to those skilled in the art that the system of lubrication disclosed particularly for an engine having crankshaft induction can be applied equally well to engines having different induction systems.

Figure 7:
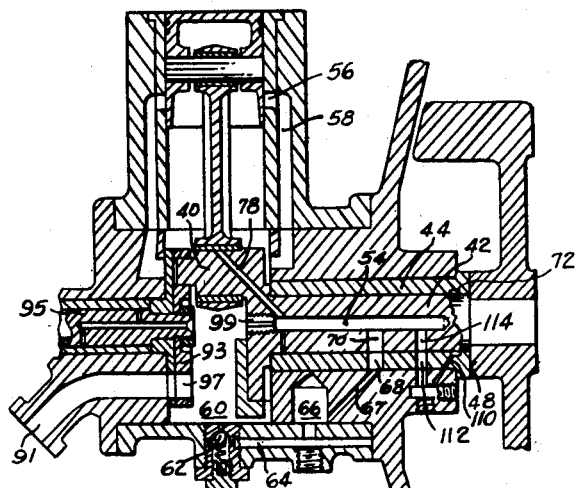
Fig. 7 is a longitudinal section of a single cylinder engine having a different system of induction.

Fig. 7 shows an engine with disc-valve controlled inlet. All the essential features of the invention are given the same numerals as those used in Fig. 2.

Figure 8:
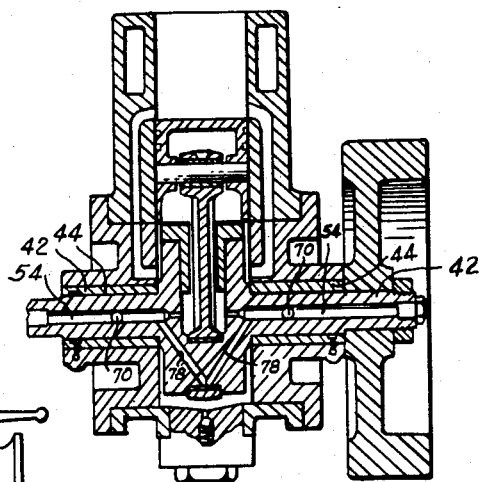
Fig. 8 is a longitudinal section of a single cylinder engine having yet another induction system.

Fig. 8 shows an engine having piston controlled induction and, again, the same numerals are used as in Fig. 2.

Figure 9:
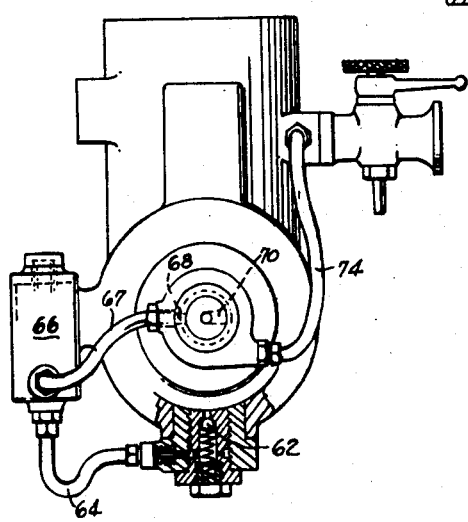
Fig. 9 is an end elevation of the engine shown in Fig. 8.

Fig. 9 is an end elevation of the engine shown in Fig. 8.

Referring to Fig. 7 numeral 91 is the inlet from the carburetor to the crankcase, the incoming gaseous mixture being controlled by the port 97 in disc-valve 93 which is mounted on shaft 95 and driven by an extension to crank-pin 40.

As before a small quantity of gaseous mixture, heavily laden with oil, is expelled through valve 62 into reservoir 66, thence via passage 67 and ports 68 and 70 into drilled passage 54 in crankshaft 42. It does not now mix with the incoming charge as in the case of an engine having crankshaft induction, as in Fig. 2, but continues along hole 54 till it meets plug 99. The gaseous portion, with some of the oil will be expelled through the small hole in plug 99. The remainder of the oil will pass up passage 78 to the crankpin, or via passage 114, port 112 and passage 110 to the oil groove 72, the same as described above with reference to Fig. 2.

The lubrication features of the invention, therefore, function in the same manner as in the case of the engine shown in Fig. 2.

Fig. 8 shows an engine having piston controlled induction and Fig. 9 is an end view. As this example of an engine to which the invention could be applied is of heavier design the pressure chamber 66 is shown as a separate component and passages 64, 67 and 74, which formerly were drilled, are shown as detachable pipes. Moreover as this engine has two main bearings the lubrication system, except for non-return valve 62, pipe 64 and chamber 66, are duplicated.

What is claimed is:

1. A lubricating system for internal combustion engines of the two-stroke cycle type having a crankshaft, a bearing, a piston, a cylinder, and a crankcase, and at least one charge transfer passage leading from the crank space of the crankcase to the cylinder space, and also having a channel through which a charge of vaporized fuel and air, together with entrained lubricating oil, is conducted to the crank space of the crankcase; comprising an oil duct connecting said bearing with said crank space, means in said crankshaft for separating entrained oil from the charge, means for conveying the separated oil into said crank space and thence through said duct to the said bearing, and means for recirculating a portion of the separated oil from said duct back to said crank space.

2. A lubrication system in accordance with claim 1, including a non-return valve in said duct, for maintaining crankcase compression pressure in said duct during the suction stroke.

3. The invention in accordance with claim 2, including means defining a pressure reservoir chamber communicating with said duct at a point between said non-return valve and the said bearing.

4. The invention in accordance with claim 3, in which said crankshaft is hollow, and including a port in said crankshaft communicating with its hollow interior and a corresponding port in the crankshaft bearing, said ports forming a part of said duct.

5. A lubrication system in accordance with claim 4, in which said pressure reservoir chamber communicates with said duct at a point between said non-return valve and said ports.

6. A lubrication system in accordance with claim 4, including an annular internal groove in and adjacent an outer end of the crankshaft bearing, and at least one channel connecting said groove with the interior of said crankshaft.

7. An oil conservation system for engines of the internal combustion piston and cylinder type having a crankshaft, a crankcase and at least one charge transfer passage leading from the cylinder space to the crank space of said crankcase, comprising an inlet channel within said crankshaft for mixed fuel vapor and entrained oil, a pocket within said crankshaft for collecting oil separated from the charge by centrifugal action, means providing a chamber for storing some of the separated oil, and means including a conduit for conveying a portion of the separated oil from said chamber to said bearing and to the inlet channel.

8. An oil conservation system in accordance with claim 7, in which said chamber is included in said crankcase, a duct connecting the crank space and said chamber, and a check valve in the duct.

9. In a two-stroke cycle internal combustion engine, a crankcase, a crankshaft bored to define an inlet channel to the crank space of said crankcase for a mixture of fuel vapor and entrained oil, an oil return line from said crank space to said inlet channel, a sleeve valve surrounding said crankshaft, and ports through said crankshaft wall and said sleeve valve for passing oil from said crank space through said oil return line back to said inlet channel during the suction stroke of said engine.

10. The combination of claim 9, including an intermediate oil reservoir located in said oil return line between said crank space and said bored crankshaft, and a check valve also in said oil return line between said crank space and said reservoir, whereby oil is delivered from said crank space to said reservoir during the compression stroke, and from said reservoir to said inlet channel during the suction stroke.

11. A lubrication system for engines of the internal combustion piston and cylinder type having a hollow crankshaft forming an inlet channel for mixed fuel vapor and entrained oil, a crankcase, and at least one charge transfer passage leading from the cylinder space to the crank space, a chamber in said crankcase for storing under pressure some of the entrained oil carried by said inlet channel, a duct leading from said crank space to said chamber, a check valve in said duct, and a second duct leading from said chamber to said inlet channel, whereby oil is passed from said chamber under pressure to said inlet channel during the suction stroke of the engine.

References Cited in the file of this patent

UNITED STATES PATENTS

| 821,915 | Altham | May 29, 1906 |
| 904,132 | Johnston | Nov. 17, 1908 |
| 1,131,296 | Twombly | Mar. 9, 1915 |
| 1,606,424 | Irgens | Nov. 9, 1926 |
| 2,172,147 | Smith | Sept. 5, 1939 |
| 2,333,524 | Conover | Nov. 2, 1943 |
| 2,682,259 | Watkins | June 29, 1954 |

FOREIGN PATENTS

| 10,667 | Great Britain | of 1913 |
| 22,059 | Great Britain | of 1904 |
| 396,881 | France | Feb. 6, 1919 |
| 454,255 | Italy | Jan. 14, 1950 |
| 856,978 | Germany | Nov. 27, 1952 |